Figure 1:
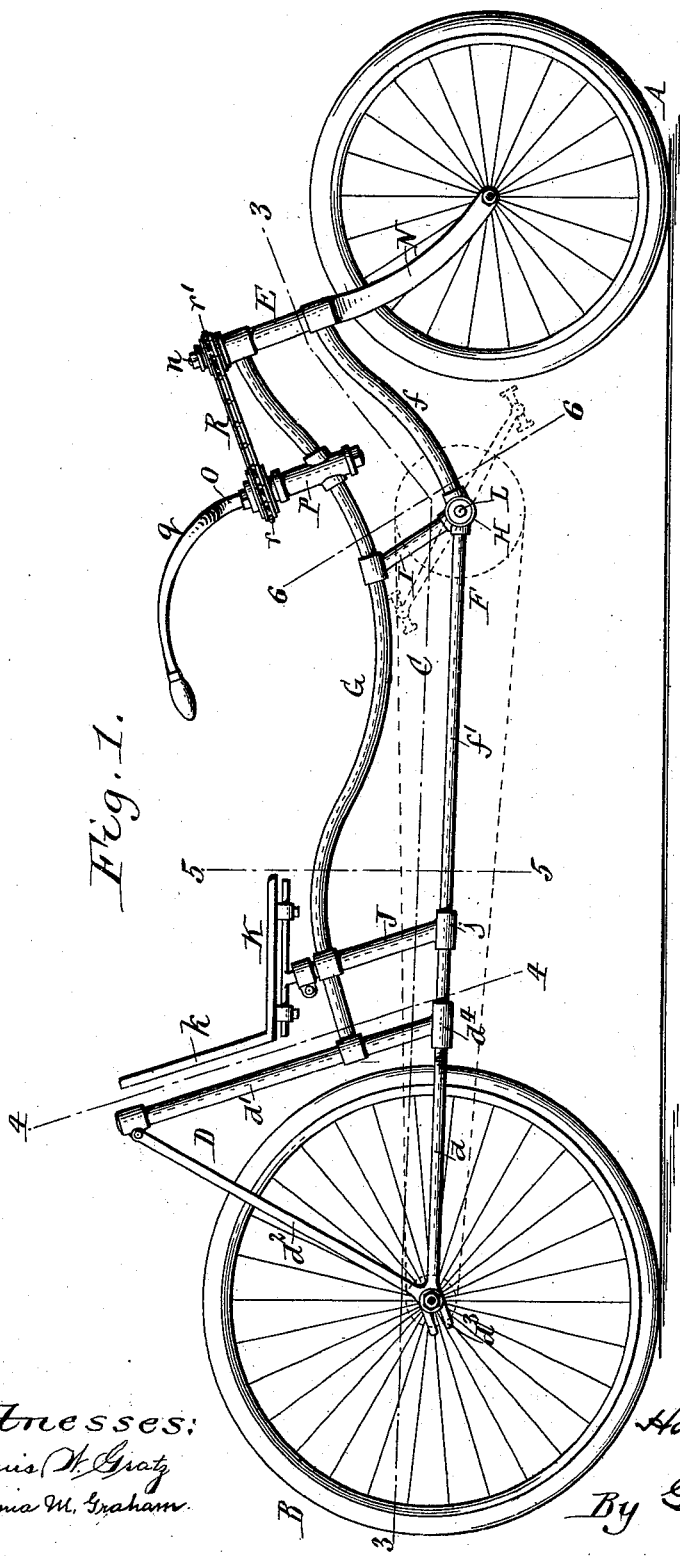

No. 690,733. Patented Jan. 7, 1902.
H. JARVIS.
BICYCLE.
(Application filed June 17, 1901.)
(No Model.) 2 Sheets—Sheet 1.

Witnesses:
Louis W. Gratz
Emma M. Graham

Harold Jarvis,
Inventor
By Geyer & Popp
Attorneys.

No. 690,733. Patented Jan. 7, 1902.
H. JARVIS.
BICYCLE.
(Application filed June 17, 1901.)
(No Model.) 2 Sheets—Sheet 2.
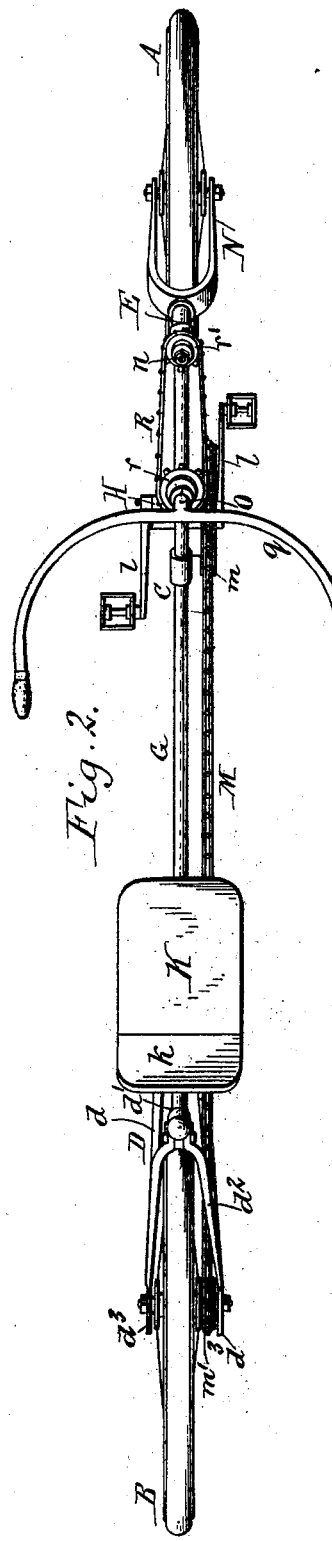
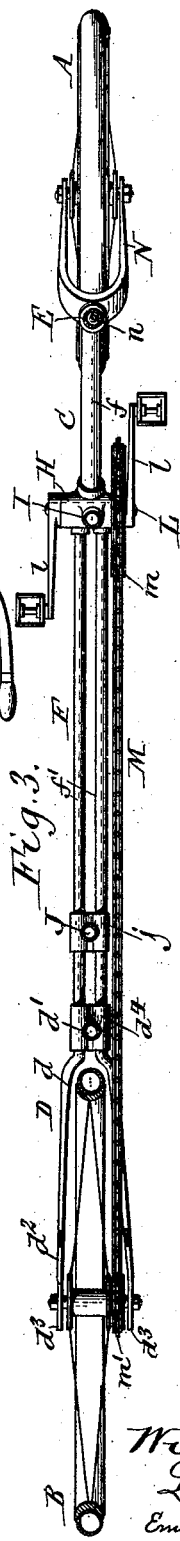
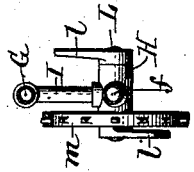
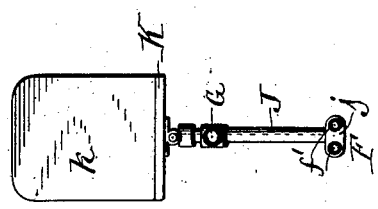
Witnesses: Harold Jarvis, Inventor
By Geyer & Popp
Attorneys.

UNITED STATES PATENT OFFICE.

HAROLD JARVIS, OF BUFFALO, NEW YORK, ASSIGNOR OF ONE-HALF TO RICHARD H. THOMPSON, OF BUFFALO, NEW YORK.

BICYCLE.

SPECIFICATION forming part of Letters Patent No. 690,733, dated January 7, 1902.

Application filed June 17, 1901. Serial No. 64,777. (No model.)

*To all whom it may concern:*

Be it known that I, HAROLD JARVIS, a citizen of the United States, residing at Buffalo, in the county of Erie and State of New York, have invented a new and useful Improvement in Bicycles, of which the following is a specification.

This invention relates more particularly to bicycles having a seat with a back-rest, but no horn or pommel.

In safety-bicycles as ordinarily constructed the seat is arranged almost directly over the crank-shaft. This arrangement necessitates the employment of a pommel or horn on the seat in order to retain the rider on the same and permit of the necessary leg movement for operating the bicycle. Aside from the injurious effects produced by riding on a seat having such a pommel or horn this location of the seat renders it impossible for the rider to exert his full strength in propelling the bicycle, this being due to the fact that the power which the rider is able to exert in propelling the wheel is derived almost wholly from his weight, which, together with the pull upon the handles, gives him the purchase to turn the cranks. It is also difficult to stop the ordinary bicycle quickly in case of emergency, because the rider upon back-pedaling to retard the machine is lifted from his seat. The checking of the speed of the wheel thus depends largely upon the weight of the rider. The arrangement of the seat directly over the crank-shaft also necessitates a construction of the frame which is much higher than is consistent with safety.

The objects of my invention are to produce a bicycle in which the rider is seated comparatively low, so that he can easily place his feet upon the ground while sitting on the seat, to so arrange the frame, seat, and driving-gear that the rider can utilize his full strength for propelling or stopping the bicycle regardless of his weight, and to so construct the frame that it admits of these advantages without sacrificing its strength or unduly increasing its weight.

In the accompanying drawings, consisting of two sheets, Figure 1 is a side elevation of a bicycle embodying my improvements, the driving mechanism being shown in dotted lines for the sake of clearness. Fig. 2 is a top plan view of the same. Fig. 3 is a horizontal section in line 3 3, Fig. 1. Figs. 4, 5, and 6 are vertical cross-sections in lines 4 4, 5 5, and 6 6, Fig. 1, respectively.

Like letters of reference refer to like parts in the several figures.

A represents the front or steering wheel, and B the rear or driving wheel.

C represents the depressed front part, and D the elevated rear part, of the frame. The rear part of the frame consists, essentially, of a substantially horizontal lower fork $d$, a rearwardly-inclined bar or post $d'$, which extends upwardly from the front end of the lower fork, and an upper fork $d^2$, which inclines from the upper end of the bar $d'$ downwardly to the rear ends of the lower fork. The rear ends of the two rearwardly-converging forks are connected by the usual slotted fork-lugs $d^3$, which receive the axle of the rear wheel. The front end of the lower fork $d$ and the lower end of the bar $d'$ are connected by a fitting $d^4$.

The depressed front part of the frame consists, essentially, of an inclined steering-head E, a lower reach member F, extending from the lower end of the steering-head downwardly and rearwardly to the lower end of the bar $d'$, and an upper reach member G, extending from the upper end of the steering-head downwardly, rearwardly, and upwardly in a compound curve to the bar $d'$, above the lower end of the latter.

H represents the crank-hanger, which is mounted on the depressed front part of the frame between the steering-head and the elevated rear part of the frame. This hanger is preferably arranged on the lower reach member as near as possible to the steering-wheel without liability of interference of the pedals with the steering-wheel when the bicycle is in use. That part of the lower reach member which extends from the steering-head to the crank-hanger preferably consists of a single bar or tube $f$, while that part of this reach member which extends from the crank-hanger to the front end of the lower rear fork $d$ consists of two bars or tubes $f'$. The upper reach member preferably consists of a single tube or bar.

I represents an inclined brace extending from the crank-hanger upwardly and rearwardly to the upper reach member.

J represents a seat-post, which is arranged in front of the bar $d'$ and preferably parallel therewith and which is connected at its lower end with the duplex bar $f'$ of the lower reach member by a fitting $j$ and connected near its upper end to the upper reach member. The upper end of the seat-post terminates below the upper end of the elevated rear part D of the frame, preferably at a point below the middle of the bar $d'$, as shown.

K represents the bottom of the seat, which is secured to the upper end of the seat-post J, and $k$ is the upright back-rest of the seat.

The driving mechanism shown in the drawings consists of a crank-shaft L, journaled in the hanger and provided with pedal-cranks $l$, and a driving-chain M, passing around sprocket-wheels $m\ m'$, secured, respectively, to the crank-shaft and the hub of the rear wheel.

N represents the front or steering fork, in which the front wheel is journaled and which has its stem $n$ journaled in the steering-head E.

O represents a steering-spindle, which is journaled in a bearing P, arranged parallel with and in rear of the steering-head and secured to the upper reach member G. The upper end of the steering-spindle is provided with a handle-bar $q$. Motion is transmitted from the steering-spindle to the stem $n$ of the steering-fork by means of a chain belt R, passing around sprocket-wheels $r\ r'$, secured, respectively, to the upper part of the steering-spindle and the stem of the front fork. The sprocket-wheel $r$ is preferably larger than the sprocket-wheel $r'$, so that a comparatively small rotary movement of the steering-spindle produces a considerable rotary movement of said fork-stem, thereby permitting the steering-wheel to be turned with less lateral movement of the handle-bar than would be the case if the handle-bar were secured directly to the fork-stem.

By constructing the frame of the bicycle with a high rear part and a comparatively low front part the forks of the rear part can be arranged at such an angle as will give the frame the greatest strength and rigidity and at the same time permit of employing a comparatively short seat-post on the front part for bringing the seat as near as possible to the ground, thus increasing the safety of the bicycle.

By placing the seat comparatively low and providing the same with a back-rest the rider in propelling the wheel occupies a position resembling that of an oarsman in rowing a boat, in which position the rider is able to exert his full strength in turning the pedals without regard to his weight, the thrust incident to propelling or stopping the wheel being exerted principally against the back-rest of the seat. This position of the rider has the further advantage of permitting the pommel or horn usually employed on bicycle-seats to be dispensed with, thereby avoiding the injurious effects resulting from the use of such a seat. In order to provide sufficient room for the legs of the rider when such a low seat is employed, the crank-shaft is placed a sufficient distance forward of the seat and the elevated rear part for this purpose.

The front wheel is made sufficiently smaller in diameter than the rear wheel to permit the use of a low steering mechanism to correspond with the position of the seat.

I claim as my invention—

1. In a bicycle, the combination of a frame comprising a steering-head arranged at its front end, a forked frame for the rear wheel arranged at its rear end and an intermediate reach composed of a pair of tube members arranged one above the other and connected at their front ends to the steering-head and at their rear ends to the lower front portion of said rear-wheel frame, whereby said wheel-frame extends above the upper reach member, a seat mounted on the upper reach member immediately in front of the rear-wheel frame, a crank-shaft journaled on the lower reach member near the steering-head, and driving-gearing connecting the crank-shaft with the rear wheel, substantially as set forth.

2. In a bicycle, the combination of a frame comprising a steering-head arranged at its front end, a forked frame for the rear wheel arranged at its rear end and an intermediate reach composed of a pair of tube members arranged one above the other and connected at their front ends to the steering-head and at their rear ends to the lower front portion of said rear-wheel frame, whereby said wheel-frame extends above the upper reach member, a seat mounted on the upper reach member immediately in front of the rear-wheel frame, a steering-spindle journaled on the upper reach member directly in rear of the steering-head and connected with the stem of the front-wheel fork, and a crank-shaft arranged on the lower reach member underneath said steering-spindle, substantially as set forth.

3. In a bicycle, the combination with a frame having a depressed front part and an elevated rear part, said rear part consisting of a substantially upright bar, a lower fork extending rearwardly from the lower end of said bar, and an upper fork extending downwardly from the upper end of said bar to the rear end of the lower fork, and said front part consisting of a steering-head, a lower reach member extending from the lower end of the steering-head rearwardly to the lower end of said bar, an upper reach member extending from the upper end of the steering-head rearwardly to said bar below the upper end thereof, a seat-post connecting the upper and lower reach members in front of said bar and having its upper end terminated below the upper end of said bar, and a seat mounted on the upper end of the seat-post, substantially as set forth.

4. In a bicycle, the combination with a frame having a depressed front part and an elevated rear part, said rear part consisting of a substantially upright bar, a lower fork extending rearwardly from the lower end of said bar and an upper fork extending downwardly from the upper end of said bar to the rear end of the lower fork, and said front part consisting of a steering-head, a reach extending from the steering-head rearwardly to said bar, a seat-post connected with said reach in front of said bar and having its upper end terminated below the upper end of said bar, and a seat mounted on the upper end of the seat-post and having a back-rest, substantially as set forth.

5. In a bicycle, the combination with a frame having a depressed front part and an elevated rear part, said front part consisting of a steering-head, upper and lower reach members extending rearwardly from the steering-head, and a seat-post connecting the rear portions of the reach members, and said elevated part consisting of a substantially upright bar connecting the rear ends of the reach members and upper and lower forks converging rearwardly from said bar, a seat mounted on the seat-post, and a crank-hanger mounted on the depressed part of the frame between the steering-head and the seat-post, substantially as set forth.

Witness my hand this 15th day of June, 1901.

HAROLD JARVIS.

Witnesses:
 THEO. L. POPP,
 CARL F. GEYER.